(12) United States Patent
Lindoff et al.

(10) Patent No.: US 7,991,378 B2
(45) Date of Patent: Aug. 2, 2011

(54) TIME-ERROR AND FREQUENCY-ERROR CORRECTION IN A MULTI-CARRIER WIRELESS COMMUNICATIONS SYSTEM

(75) Inventors: Bengt Lindoff, Bjärred (SE); Bo Bernhardsson, Lund (SE); Fredrik Nordström, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 508 days.

(21) Appl. No.: 12/198,366

(22) Filed: Aug. 26, 2008

(65) Prior Publication Data

US 2009/0258628 A1 Oct. 15, 2009

Related U.S. Application Data

(60) Provisional application No. 61/044,592, filed on Apr. 14, 2008.

(51) Int. Cl.
*H04B 1/16* (2006.01)
(52) U.S. Cl. ............ 455/334; 455/182.1; 455/323; 375/326
(58) Field of Classification Search ............ 455/181.1, 455/182.1, 255–260, 313, 323, 334; 375/324, 375/326
See application file for complete search history.

(56) References Cited

U.S. PATENT DOCUMENTS

| 5,953,649 | A | * | 9/1999 | Junell | 455/67.11 |
| 6,049,708 | A | * | 4/2000 | Tsujita | 455/334 |
| 6,571,088 | B1 | * | 5/2003 | Hasegawa | 455/182.2 |
| 7,072,783 | B2 | * | 7/2006 | Makhlouf et al. | 702/69 |
| 7,149,260 | B2 | * | 12/2006 | Kim et al. | 375/321 |
| 2007/0098097 | A1 | | 5/2007 | Khan et al. | |
| 2007/0286262 | A1 | | 12/2007 | Sestok et al. | |
| 2008/0151980 | A1 | | 6/2008 | Lindoff et al. | |

FOREIGN PATENT DOCUMENTS

| WO | 03/098258 A1 | 11/2003 |
| WO | 2005/029722 A1 | 3/2005 |
| WO | 2008/042575 A2 | 4/2008 |

OTHER PUBLICATIONS

Meyr, H. et al. "Chapter 8 Frequency Estimation." Digital Communication Receivers: Synchronization, Channel Estimation, and Signal Processing, John Wiley & Sons, Inc., 1998, pp. 445-504.

(Continued)

*Primary Examiner* — Nhan Le
(74) *Attorney, Agent, or Firm* — Coats & Bennett, P.L.L.C.

(57) ABSTRACT

Methods and apparatus for automatic frequency control in wireless receivers configured to simultaneously receive multiple carrier signals at distinct radio frequencies are disclosed. An exemplary wireless device comprises at least first and second radio front-end circuits configured to receive first and second wireless communication signals transmitted via first and second radio-frequency carriers at distinct first and second radio frequencies, respectively, a control processor configured to designate a master carrier signal and a slave carrier signal from among the received wireless communication signals, and a frequency error estimation circuit configured to estimate a first receiver frequency error using the received master carrier signal. The control processor is further configured to calculate a second receiver frequency error from the first receiver frequency error, for use in compensating one or more receiver processes performed on the slave carrier signal.

24 Claims, 5 Drawing Sheets

OTHER PUBLICATIONS

Smida, B. et al. "A Spectrum-Efficient Multicarrier CDMA Array-Receiver and Diversity-Based Enhanced Time and Frequency Synchronization." IEEE Transactions on Wireless Communications, vol. 6, No. 6, Jun. 2007, pp. 2315-2327.

3rd Generation Partnership Project. 3GPP TR 25.825, V1.0.0 (May 2008). "3rd Generation Partnership Project; Technical Specification Group Radio Access Network; Dual-Cell HSDPA Operation."

3rd Generation Partnership Project. 3GPP TR 36.913, V8.0.0 (Jun. 2008). "3rd Generation Partnership Project; Technical Specification Group Radio Access Network; Requirements for Further Advancements for E-UTRA (LTE-Advanced)(Release 8)."

3rd Generation Partnership Project. 3GPP TSG RAN #39. RP-080228. "Feasibility Study on Dual-Cell HSDPA Operation." Puerto Vallarta, Mexico, Mar. 4-7, 2008.

* cited by examiner

TIME-ERROR AND FREQUENCY-ERROR CORRECTION IN A MULTI-CARRIER WIRELESS COMMUNICATIONS SYSTEM

RELATED APPLICATIONS

This application claims priority under 35 U.S.C. §119(e) from the U.S. Provisional Patent Application Ser. No. 61/044,592, which was filed on 14 Apr. 2008 and entitled "Time and Frequency Error Correction Methods for Multi-Carrier LTE/HSPA."

TECHNICAL FIELD

The present invention generally relates to wireless communication systems, and particularly relates to automatic frequency control (AFC) in a multi-carrier system.

BACKGROUND

Although emerging cellular system standards such as those defined by the Long-Term Evolution (LTE) initiative of the $3^{rd}$-Generation Partnership Project (3GPP) promise unprecedented data rates and flexibility for wireless systems, market pressures for ever increasing data rates are likely to continue. Of course, higher data rates generally require larger system bandwidths. For fourth-generation (4G) mobile communication systems, systems developers are discussing radio-frequency bandwidths of up to 100 MHz. However, because radio spectrum is a limited resource that must be shared between many wireless applications, wireless systems, and network operators, finding contiguous spectrum blocks to meet these needs is very difficult.

Figure 1:
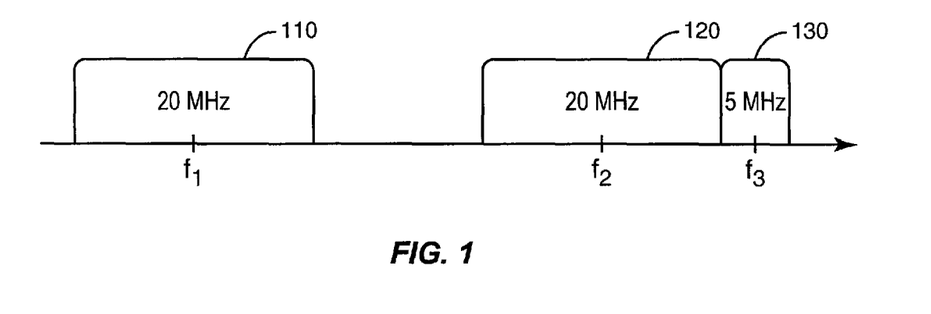
FIG. 1 illustrates the aggregation of several blocks of frequency spectrum in a multi-carrier system.

One solution to this problem is to aggregate blocks of spectrum, including non-contiguous blocks, to assemble a large system bandwidth. This can be seen in FIG. 1, where spectrum blocks 110, 120, 130, comprising two 20 MHz blocks and a single 5 MHz block, at radio carrier frequencies f1, f2, and f3, respectively, can be combined to yield a total system bandwidth of 45 MHz. With such an approach it will be possible to aggregate sufficiently large system bandwidths to support data rates up to and above 1 Gigabit per second, a throughput requirement for the 4 G, "IMT-Advanced" (International Mobile Telecommunications-Advanced) systems contemplated by the International Telecommunication Union (ITU). Furthermore, such a scenario makes it possible to adapt the aggregation of spectrum blocks to temporal and geographical constraints, making such a solution very flexible.

Several existing cellular systems, such as those defined in 3GPP's LTE specifications, may be extended in a straightforward manner to support contiguous and non-contiguous spectrum usage with the introduction of multi-carrier operation. In multi-carrier mode, two or more blocks of spectrum are aggregated, with each block corresponding to a radio-frequency carrier signal formatted and transmitted according to the existing standards for LTE. This approach is generally outlined in the 3GPP document, "3rd Generation Partnership Project; Technical Specification Group Radio Access Network; Requirements for Further Advancements for E-UTRA (LTE-Advanced) (Release 8), 3GPP TR 36.913 v. 8.0.0 available at http://www.3gpp1.org/ftp/Specs/html-info/36913.htm. An LTE-Advanced mobile terminal adapted for multi-carrier operation is thus able to simultaneously receive two or more LTE carriers, each of which may have a different bandwidth, transmitted at different carrier frequencies.

A similar approach may be taken with other existing wireless standards. For instance, data targeted for a particular mobile terminal may be split between two or more distinct High-Speed Downlink Packet Access (HSDPA) carriers, at different frequencies, to achieve much higher data rates than previously possible. HSDPA-specific issues for multi-carrier operation are also currently being addressed by 3GPP, as outlined in the 3GPP document, "Technical Specification Group Radio Access Network; Dual-Cell HSDPA Operation," 3GPP TR 25.825 V1.0.0 (2008-05), available at http://www.3gpp.org/ftp/specs/html-info/25825.htm.

As is well known to those skilled in the art, frequency and time tracking, or Automatic Frequency Control (AFC), are important aspects of mobile terminal design. Because mobile devices generally rely on inexpensive oscillators to provide a time and frequency reference, the device receiver must repeatedly estimate the time and frequency error between a received signal and the on-board reference to correctly and efficiently receive and decode transmitted data. Of course, this will also be true for multi-carrier extensions of today's HSPA and LTE system. Accordingly, improved techniques are needed for efficiently measuring and tracking frequency and time errors in a multi-carrier wireless terminal without unduly increasing the complexity of the resulting receiver design.

SUMMARY

Methods and apparatus are disclosed for automatic frequency control in wireless receivers configured to simultaneously receive and process communication signals transmitted on multiple distinct radio frequency carriers, such as the multi-carrier modes contemplated for LTE-Advanced and dual-cell HSDPA operation. The techniques disclosed herein make it possible to track frequency and timing errors on all received component carriers without performing continuous measurements on all of the component carriers, thus reducing receiver complexity and power consumption.

In particular, frequency-error and timing-error correction loops are coupled to each other in various embodiments of the invention, such that receiver frequency error and time offset estimated from measurements performed on a master carrier signal can be used to derive corresponding frequency error and time offsets for one or more slave carrier signals. In some embodiments, master and slave carrier signals are designated from among the received carriers based on such criteria as signal quality, whether a particular carrier is an anchor carrier, carrier loading, and relative data allocations between the carriers. In some embodiments, master and slave carrier signals may be re-designated based on one or more of these criteria.

An exemplary wireless device for use in a multi-carrier system thus includes a receiver comprising at least first and second radio front-end circuits configured to receive at least first and second wireless communication signals transmitted via first and second radio-frequency carriers at distinct first and second radio frequencies, respectively. The exemplary device further comprises a control processor configured to designate a master carrier signal and a slave carrier signal from among the received wireless communication signals, responsive to one or more of the signals, and a frequency error estimation circuit configured to estimate a first receiver frequency error for the device, using the received master carrier signal. The control processor is further configured to calculate a second receiver frequency error from the first receiver frequency error, for use in compensating one or more receiver processes performed on the slave carrier signal. The second receiver frequency error, which represents the device frequency error corresponding to the slave carrier signal, is thus derived directly from the frequency error corresponding to the master carrier signal, without the need for direct measurements of the slave carrier signal.

In some embodiments, similar techniques are applied to receiver timing estimation and compensation, in which case the exemplary receiver comprises a timing circuit configured to estimate a first timing offset using the master carrier signal. The control processor in such embodiments is further configured to derive a second timing offset from the first timing offset and the frequency difference between the first and second radio-frequency carriers for use in adjusting a timing for one or more receiver processes performed on the slave carrier signal.

Variations of the above-described receivers are also disclosed, including receiver circuits adapted to process three or more carriers in a multi-carrier signal and receiver circuits configured to dynamically re-designate master and slave carrier signals based on changes in signal conditions or configurations. Corresponding methods are also disclosed. Of course, the present invention is not limited to the above features and advantages. Indeed, those skilled in the art will recognize additional features and advantages upon reading the following detailed description, and upon viewing the accompanying drawings.

DETAILED DESCRIPTION

Various automatic frequency control (AFC) techniques for keeping track of time offsets and receiver frequency error, i.e., differences between a local time/frequency reference in a wireless receiver and the frequency and timing of a received modulated signal, are well known in the art. In some cases, these algorithms are based on a complex correlation operation using sampled data corresponding to two known symbols (e.g., HSPA Common Pilot Channel symbols, LTE reference symbols, LTE synchronization symbols, etc.) at two time instances separated by a known time interval. If the radio channel is assumed to be constant during the interval between the two symbols then the argument (i.e., phase) of the correlation output will be proportional to the frequency error. A frequency error estimated by such a correlation process may be filtered and used to compensate one or more receiver processes driven by the local frequency reference.

Mathematically, this correlation process can be written according to:

$$\Delta f = \frac{1}{2\pi\tau} \arg \sum_{t=0}^{N-1} x_{t+\tau} x_t^*, \quad (1)$$

where x* is the complex conjugate of sample x, τ is the time interval between the known symbols, and the function "arg" returns the phase between the imaginary and real parts of the functions input. The summation spans N samples taken over the symbol period.

In an LTE receiver, a variation of this approach to estimating receiver frequency error with respect to a received carrier can be employed using the cyclic prefix for an Orthogonal Frequency-Division Multiplexing (OFDM) symbol, with data samples obtained from a point in the receiver processor prior to the discrete Fourier Transform (DFT) used to convert the OFDM sub-carriers into discrete symbols. Because the cyclic prefix is a "copy" of the last portion of the OFDM symbol, data samples from the cyclic prefix can be correlated with corresponding samples from the OFDM symbol to estimate frequency error. In this case, an equation similar to Equation (1) applies:

$$\Delta f = \frac{1}{2\pi\tau_S} \cdot \arg\left(\sum_{k=0}^{N_{CP}-1} x_{k+\tau_S} x_t^*\right), \quad (2)$$

where x is a time-domain sample of the received OFDM signal, x* is the complex conjugate of sample x, $N_{CP}$ is the length of the cyclic prefix, in samples, and $\tau_S$ is the length of the OFDM symbol (not including the cyclic prefix). If desired, the resulting frequency error may be averaged or smoothed across several OFDM symbols.

Timing error, i.e., the difference between a locally-obtained time reference and the timing of the symbols in the received data stream, is closely coupled to the receiver frequency error. In an LTE receiver, one approach to estimating a time offset relative to the received signal is to use a cyclic prefix and samples from the corresponding OFDM symbol. For instance, one can compute:

$$\Lambda_t = \left| \sum_{k=0}^{N_{CP}-1} x_{t+k+\tau_S} x_{t+k}^* \right| \quad (3)$$

for each of several time offsets t, where $N_{CP}$ is the length of the cyclic prefix and $\tau_S$ is the time between start and end of an OFDM symbol. The value of t yielding the maximum value for $\Lambda_t$ corresponds to the timing offset between the receiver and the received signal. This timing offset may be used to adjust one or more receiver processes performed on the received signal, such as the timing of Rake fingers in a Wideband-CDMA (W-CDMA) receiver, or the timing of a fast Fourier Transform (FFT) window in an LTE receiver.

The techniques described above are just a few of those known to those skilled in the art. In addition, more complex algorithms for estimating frequency error in LTE (or other OFDM-based) wireless systems are described in patent application PCT/EP2008/055454, filed on May 5, 2008, and in U.S. Patent Application Publication 2008/0151980, filed Dec. 22, 2006, the contents of which are each incorporated by reference herein. In previous systems, frequency error for a received signal is typically measured using only known symbols received from the serving cell. In HSPA/W-CDMA systems supporting soft handover, it is also known to utilize separate AFC functions for each of two or more cells in the active set. None of these techniques are directly applicable to multi-carrier LTE or HSPA systems, however, in which two or more wireless communication signals, each formatted according to conventional specifications, are transmitted via separate radio-frequency carriers at distinct radio frequencies. This is especially true for systems where the radio-frequency carriers are deployed in non-contiguous blocks of spectrum. Therefore there is a need for efficient (both in terms of performance and power consumption) time-error and frequency-error control mechanisms suitable for multi-carrier LTE and HSPA systems.

Figure 2:
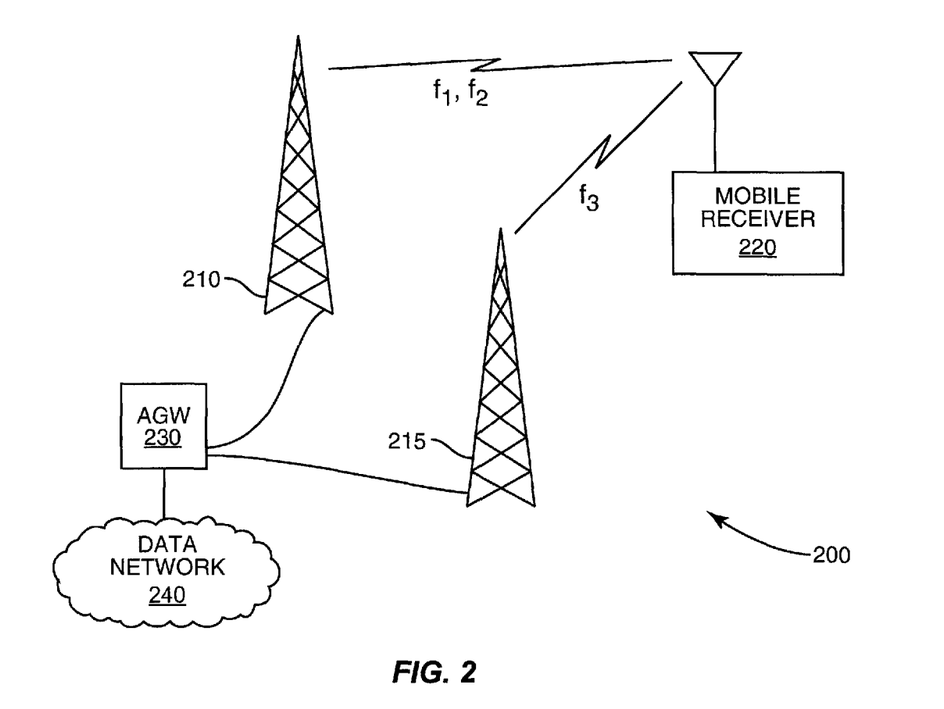
FIG. 2 is a simplified diagram of a wireless communication network according to some embodiments of the invention.

A multi-carrier wireless system 200 is illustrated in FIG. 2, including transmitters 210 and 215 and a mobile receiver 220 configured according to some embodiments of the invention. In the pictured system, transmitters 210 and 215 each comprise an LTE evolved Node-B (eNodeB), transmitting downlink data received from Access Gateway (AGW) 230 to mobile receiver 220. AGW 230, in turn, receives data from IP-based data network 240, which may comprise a private data network and/or a public data network, such as the Internet. Although the inventive techniques discussed herein are generally described with reference to LTE systems and devices, those skilled in the art will appreciate that the methods and apparatus disclosed may also be applied to other wireless communication signals, such as multi-carrier HSPA signals.

In the system pictured in FIG. 2, first and second radio carriers, at frequencies f1 and f2, respectively, are transmitted to mobile receiver 220 from transmitter 210. A third radio carrier, at radio carrier frequency f3, is transmitted by transmitter 215. Thus, three radio carriers, transmitted from two separate transmitters, are aggregated for downlink data transfer in the pictured system. In other systems, aggregated radio carriers might be transmitted from only a single transmitter.

Figure 3:
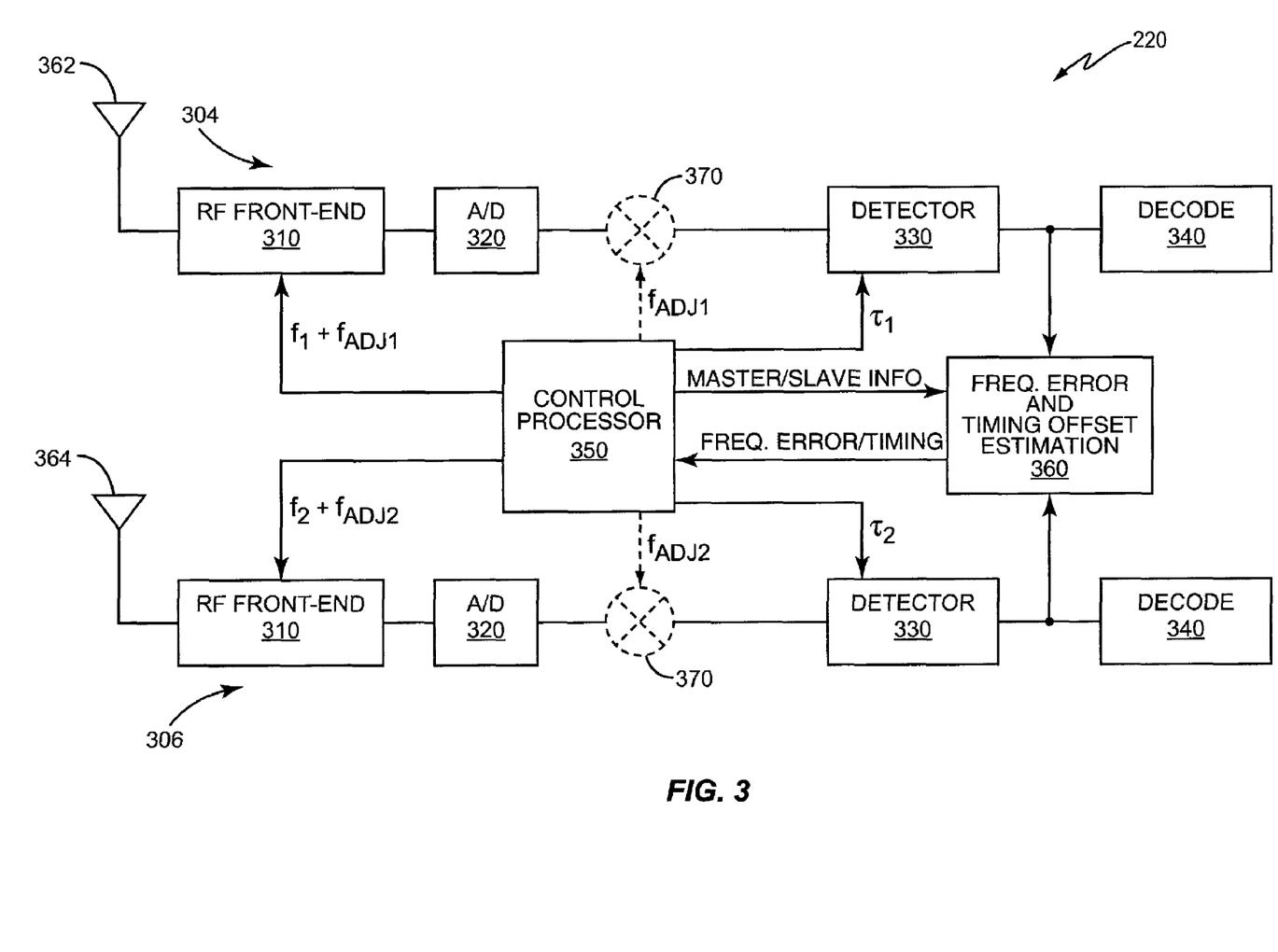
FIG. 3 is a functional block diagram of an exemplary multi-carrier wireless receiver apparatus according to some embodiments of the invention.

A block diagram illustrating a portion of an exemplary mobile receiver 220 is provided in FIG. 3. Mobile receiver 220 comprises at least two receiver branches 304 and 306, each having a conventional radio-frequency (RF) front end circuit 310 that may include a local oscillator and a phase-locked loop (PLL) or similar circuitry for transforming a reference frequency signal from a crystal oscillator (not shown) up to a desired local oscillator frequency. In some embodiments, each RF front-end circuit 310 may comprise a zero-IF downconverter, in which case the desired local oscillator equals the radio carrier frequency for the desired communications signal. In other embodiments, other downconversion schemes may be employed, in which case the desired local oscillator frequency may be offset by a pre-determined frequency from the desired radio carrier frequency.

Those skilled in the art will appreciate that some embodiments of a multi-carrier receiver may share one or more components among two or more branches, although the receiver 220 pictured in FIG. 3 includes completely distinct receiver chains 304 and 306, including two separate antenna elements 362 and 364. For instance, in some embodiments two receiver branches might share an antenna, a front-end filter or duplex filter, low-noise amplifier circuit, or the like. Other embodiments may include more than two receiver branches as well, to accommodate more than two distinct wireless communication signals on separate radio-frequency carriers. Furthermore, although the discussion herein generally assumes that receiver branches 304 and 306 are configured to process the same type of signals (although possibly with different bandwidths), other configurations, in which two or more receiver branches are configured to process different signal types, are also possible. Thus, various embodiments of the present invention might comprise, for instance, a mobile receiver 220 having a first receiver branch configured for processing an LTE downlink signal and a second receiver branch configured for process an HSPA signal.

In any event, coupled to each RF front-end circuit 310 is an analog-to-digital converter (A/D) circuit 320 for converting the analog baseband signal to a digital signal. In a typical embodiment, RF front-end circuits 310 provide in-phase and quadrature (I/Q) versions of the downconverted signal to the A/D circuits 320, so that A/D circuits 320 output complex signal samples, although those skilled in the art will appreciate that A/D circuits 320 may operate on an intermediate frequency (IF) signal, and that other representations of the digitized signal are possible. In any case, following the A/D circuit 320 in each receiver branch is a detector circuit 330, the details of which will vary depending on the type of communications signal being processed. For instance, detector circuits 330 may perform a fast Fourier Transform (FFT) operation on the digitized signal samples in the case of an OFDM based system such as LTE. In a High-Speed Packet Access (HSPA) Wideband-CDMA system, on the other hand, detector circuits 330 may comprise a Rake receiver or generalized-Rake (G-RAKE) receiver circuit. Following the detectors 330 are decoders 340, which decode user data from the demodulated symbols provided by detectors 330.

In the mobile receiver 220 pictured in FIG. 3, demodulated symbols from the incoming signal are supplied by detectors 330 to frequency-error and timing-offset estimation circuit 360, which is referred to hereinafter as "AFC unit 360." Thus, in this embodiment, AFC unit 360 uses known pilot symbols to estimate the receiver frequency error and time offset with respect to the received signals for one or both receiver branches 304 and 306. In other embodiments, AFC unit 360 may process pre-detector signal samples instead of or in addition to the post-detector symbols. For instance, in an embodiment configured to process LTE OFDMA signals, AFC unit 360 may process pre-detector signal samples to determine receiver frequency error and/or timing offset from one or more OFDM symbols and their respective cyclic prefixes. Accordingly, those skilled in the art will appreciate that AFC unit 360 may perform frequency-error and/or time-offset estimation, relative to the received signal on either of the two receiver branches 304 and 306, using any of a variety of known algorithms and techniques.

Although it is possible to perform frequency-error and/or time-offset estimation for each of the two or more received carrier signals, it is generally advantageous to reduce processing complexity, as well as to reduce the receiver's power consumption. Accordingly, AFC unit 360 and control processor may be configured, according to some embodiments of the invention, to track the frequency and timing error with respect to all component carriers without the need for continuous estimation of each component carrier all the time. This makes it possible, for instance, to save power by turning off the RF front-end circuitry and other circuitry dedicated to processing one or more of the carrier signals, when those carrier signals are not scheduled to carry data targeted to the receiver.

This is accomplished by designating at least one of multiple wireless communication signals transmitted via distinct radio-frequency carriers, at distinct frequencies, as a "master" carrier signal, and at least one signal as a "slave" carrier signal. This designation may be performed dynamically by control processor 350. In some cases, as will be described in more detail below, control processor 350 may occasionally re-designate the carrier signals, so that a slave carrier signal becomes a master carrier signal, and vice-versa. In any case, referring once more to FIG. 3, these designations are supplied to the AFC unit 360 (via the signal path labeled "Master/Slave Info). In response, AFC unit 360 performs receiver frequency error estimation with respect to whichever receiver branch is tuned to receive the designated master carrier signal. This frequency-error estimation process may use any known techniques, as discussed above, and in particular may be based on pre-detector signal samples from the master carrier signal, post-detector symbol values extracted from the master carrier signal, or both. In a similar fashion, AFC unit 360 may also estimate a receiver time offset relative to the master carrier signal, again using pre-detector samples or detected symbols from the master carrier signal.

Frequency-error information and time-offset information with respect to each master carrier signal are supplied by AFC unit 360 to control processor 350, which uses this information to calculate the receiver frequency error with respect to one or more slave carrier signals. In some embodiments, this information is also used to calculate receiver timing offsets with respect to each slave carrier signal. As shown in FIG. 3, timing offsets, represented by $\tau_1$ and $\tau_2$, are fed to respective detectors 330, for use in adjusting the detector timing. Those skilled in the art will appreciate that timing offset data may be used to adjust timing for one or more other receiver processes as well. The timing offset corresponding to the master carrier signal is estimated directly from the signal itself, while a timing offset corresponding to the slave carrier signal is derived from the first timing offset, as discussed in more detail below.

Similarly, frequency error information for each of the carrier signals, denoted in FIG. 3 as $f_{ADJ1}$ and $f_{ADJ2}$, is used by each of the receiver branches to compensate one or more receiver processes performed on the respective carrier signals. As with the timing offsets discussed above, frequency error information corresponding to a master carrier signal is estimated directly from the master carrier signal, while the receiver frequency error for a slave carrier is derived from the master carrier signal frequency error.

Accordingly, those skilled in the art will appreciate that the term "master carrier signal" as used herein generally refers to those component carriers of an aggregated multi-carrier downlink from which the mobile terminal directly estimates time offsets and/or receiver frequency errors. Likewise, the term "slave carrier signal" as used herein generally refers to those component carriers of an aggregated multi-carrier downlink for which the mobile terminal derives time offsets and/or receiver frequency errors, based at least on the receiver frequency error with respect to master carrier signals.

The details of such operation are most readily understood if it is assumed that the distinct transmitted radio carriers are originally derived from the same frequency reference, or that the frequency error between their respective references is negligible. The former is likely to be the case where the two or more radio carriers are generated by and transmitted by the same base station. Since all received component carriers are typically processed in the mobile receiver using local oscillator signals and sampling clocks derived from the same crystal oscillator, a receiver frequency error $\Delta_1$ estimated with respect to a first carrier frequency f1 can be translated to a frequency error $\Delta_2$, corresponding to a second carrier at frequency f1, by calculating:

$$\Delta_2 = \Delta_1 \cdot f2/f1. \quad (4)$$

Alternatively, if the estimated frequency error with respect to a first carrier signal has been translated to an error $\Delta_1$ for the crystal oscillator, running at frequency f0, then the calculation to transform the receiver frequency error to be relative the carrier frequency f2 is:

$$\Delta_2 = \Delta_0 \cdot f2/f0. \quad (5)$$

In a receiver processing three or more radio carriers, two (or more) of the signals can be designated as master carrier signals. In these embodiments, receiver frequency errors with respect to each master carrier signal are estimated from the respective signals. The receiver frequency error with respect to a slave carrier signal can be calculated as a weighted average of the receiver frequency errors estimated for the master carrier signals. For instance, given estimated frequency error estimates $\Delta_1$, and $\Delta_2$, corresponding to master carrier signals at carrier frequencies f1 and f2, respectively, the receiver frequency error for a slave carrier signal at carrier frequency f3 may be derived using:

$$\Delta_3 = a_1 \cdot \Delta_1 \cdot f3/f1 + a_2 \cdot \Delta_2 \cdot f3/f2, \quad (6)$$

where $a_1$ and $a_2$ are averaging weights.

In the simplest embodiments, averaging weights $a_1$ and $a_2$ may be set to one-half, so that the receiver frequency error estimates for each of the master carrier signals are equally weighted. In other embodiments, however, the values for $a_1$ and $a_2$ may be selected or calculated based on, for example, the signal strengths or signal-to-interference rations (SIRs) of the respective carrier signals. Thus, for example, the frequency error corresponding to a master carrier signal having a higher signal strength, or higher SIR, may be weighted more heavily in the derivation of the frequency error corresponding to the slave carrier signal.

In any event, referring yet again to FIG. 3, control processor 350 uses the receiver frequency errors, whether estimated from master carrier signals or derived for slave carrier signals, to compensate one or more receiver processes performed on the respective signals. Thus, as shown in FIG. 3, control processor 350 may adjust a frequency signal supplied to each RF front-end 310, in which case a local oscillator frequency is adjusted to correct for the receiver frequency error. In some embodiments, the receiver frequency error information may be instead applied in the digital domain to correct for receiver frequency error. Accordingly, FIG. 3 illustrates an optional digital de-rotation circuit 370 in each of receiver branches 304 and 306, in which frequency error can be removed in the digital domain according to well-known techniques. Of course, those skilled in the art will appreciate that a combination of both of these techniques may be used in some embodiments, such that both analog and digital processes are used to compensate the received signal for receiver frequency error.

Figure 4:
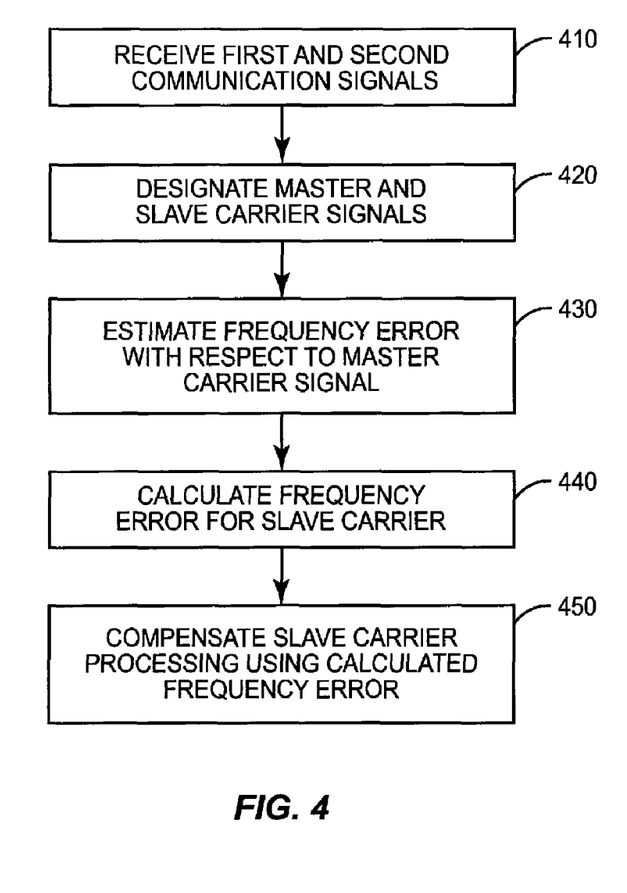
FIG. 4 is a logic flow diagram illustrating automatic frequency control (AFC) processing according to some embodiments of the invention.

FIG. 4 is a process flow diagram illustrating an exemplary method of frequency error compensation in a wireless device, as was generally described above. Those skilled in the art will appreciate that the method depicted in FIG. 4 may be implemented in various receivers configured for multi-carrier operation, including, but not limited to, receivers having a structure similar to the mobile receiver 220 pictured in FIG. 3.

The process illustrated in FIG. 4 begins with the reception of at least first and second wireless communication signals, as shown at block 410. These wireless communication signals are transmitted via first and second radio-frequency carriers, at distinct first and second radio frequencies, respectively. These signals may comprise contiguous radio carriers, formatted according to conventional telecommunications standards, that have been aggregated to achieve larger link bandwidths. Alternatively, the first and second radio-frequency carriers may correspond to non-contiguous spectrum allocations. In other words, the first and second radio-frequency carriers may be separated by one or more blocks of spectrum allocated to other services.

One of the first and second wireless communication signals is designated as a master carrier signal, while the other is designated as a slave carrier signal, as pictured at block 420. The criterion or criteria for determining which is which may vary from one embodiment to another, but the determination is typically based on the content, configuration, or quality of one or both of the signals. These criteria may include, for instance, the relative signal powers for each of the wireless communication signals, or other signal quality measure such as signal-to-interference ratio (SIR). Thus, if one signal has a significantly higher SIR than the other, it may be preferred for use as a master carrier signal. In some embodiments, the master carrier signal may be selected to coincide with an "anchor" signal, i.e., a signal carrying primary control information for the mobile receiver. In still other embodiments, the master carrier signal may be selected to coincide with a signal currently scheduled to carry downlink user data, or the signal scheduled to carry the majority of the downlink user data targeted to the mobile station. In other embodiments, information indicating the carrier loading of the downlink signals may be used to select the master carrier signal. Those skilled in the art will recognize that a more heavily loaded LTE signal, for instance, will carry more energy in the cyclic prefix than a less heavily loaded signal, thus making the heavily loaded signal more attractive for use in estimating frequency error or time offsets. Carrier loading information may be derived, in some embodiments, from signaling data included in one or both of the wireless communication signals. In any case, various combinations of these criteria (and others) may be used in some embodiments to designate which received signals are master carrier signals and which are slave carrier signals.

As shown at block 430, a first receiver frequency error for the device is estimated with respect to the master carrier signal, using any conventional technique for determining a frequency error based on measurements of the master carrier signal. This receiver frequency error represents the error in the local reference frequency relative to the master carrier frequency. At block 440, a second receiver frequency error, corresponding to the slave carrier signal, is then calculated from the first frequency error. This calculation may simply comprise, for instance, the transforming of the first frequency error according to Equation (4). At block 450, the second receiver frequency error is used to compensate one or more receiver processes performed on the first slave carrier signal. For instance, as discussed earlier, the second receiver frequency error may be used to adjust a local oscillator used to downconvert the slave carrier signal, or to adjust the frequency of a digital downconversion or de-rotation operation.

Those skilled in the art will appreciate that similar processes may be used to determine receiver timing offsets for the master and slave carrier signals. This is illustrated in the process flow diagram of FIG. 5. As shown at block 510, a first timing offset is estimated with respect to the master carrier signal. Conventional techniques, including the correlation techniques described earlier, may be used to obtain an optimal receiver timing offset for the master carrier signal.

Figure 5:
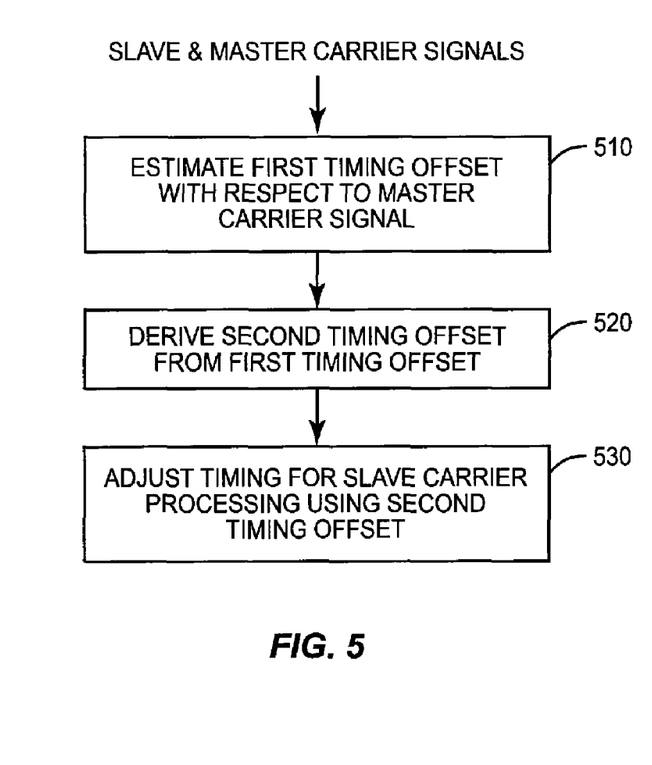
FIG. 5 is a logic flow diagram illustrating the processing of timing offsets in some embodiments of the invention.

At block 520, a second timing offset, corresponding to the slave carrier signal, is derived from the first timing offset. At block 530, this second timing offset is used to adjust the timing for one or more receiver processes performed on the slave carrier signal. The details of the derivation of the second timing offset may vary, depending upon the receiver implementation and/or the system configuration. For example, if the slave and master carrier signals are known to be synchronized, or to be offset according to a pre-determined relationship, then the slave carrier timing offset may be directly derived from the master carrier timing. Extrapolating timing across an interval of time, such as across a "sleep" interval, may require that frequency error information for one or both carriers is also used to derive the second timing offset.

Figure 6:
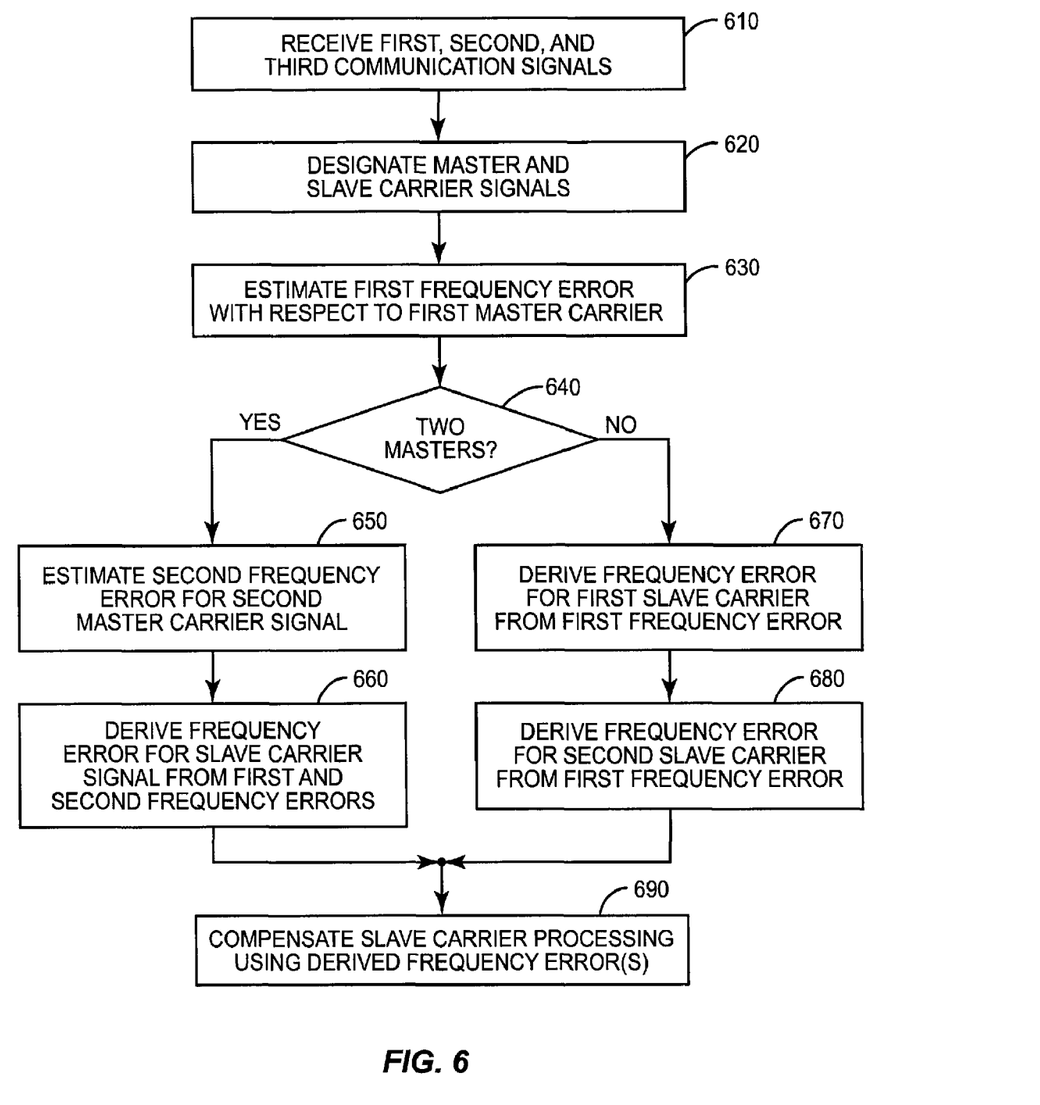
FIG. 6 is another logic flow diagram illustrating a method of processing three carrier signals according to some embodiments of the invention.

As noted earlier, some receivers may be configured to process more than two communication signals transmitted on distinct carriers. An exemplary procedure for processing three such signals is illustrated in FIG. 6; those skilled in the art will appreciate that corresponding techniques to systems processing four or more signals.

As shown at block 610, first, second, and third communication signals are received, each of the wireless communication signals transmitted via separate radio-frequency carriers at distinct radio frequencies. At block 620, master and slave carrier signals are designated, using one or more criteria such as were discussed earlier with respect to FIG. 4. At least one of the signals is designated a master carrier signal; the receiver frequency error with respect to that signal is estimated, as shown at block 630, again using conventional techniques.

In some cases, two of the signals may be designated as master carrier signals, with the remaining signal designated a slave carrier. In other instances, only one master carrier signal is designated, with the other two signals designated as slave carrier signals. In the former case, as determined at block 640, a second receiver frequency error is estimated from the second master carrier signal. At block 660, a frequency error for the single slave carrier signal is derived, using the first and second receiver frequency errors. As discussed earlier, the frequency error for the slave carrier signal may be calculated as a weighted average of the two master carrier signal frequency errors, in some embodiments. If, on the other hand, only a single master carrier has been designated, then frequency errors for each of the first and second slave carrier signals are derived from the first receiver frequency error, as shown at blocks 670 and 680. In either event, the derived error or errors are used to compensate one or more receiver processes (e.g., downconversion) for the slave carrier signal or signals, as shown at block 690.

Figure 7:
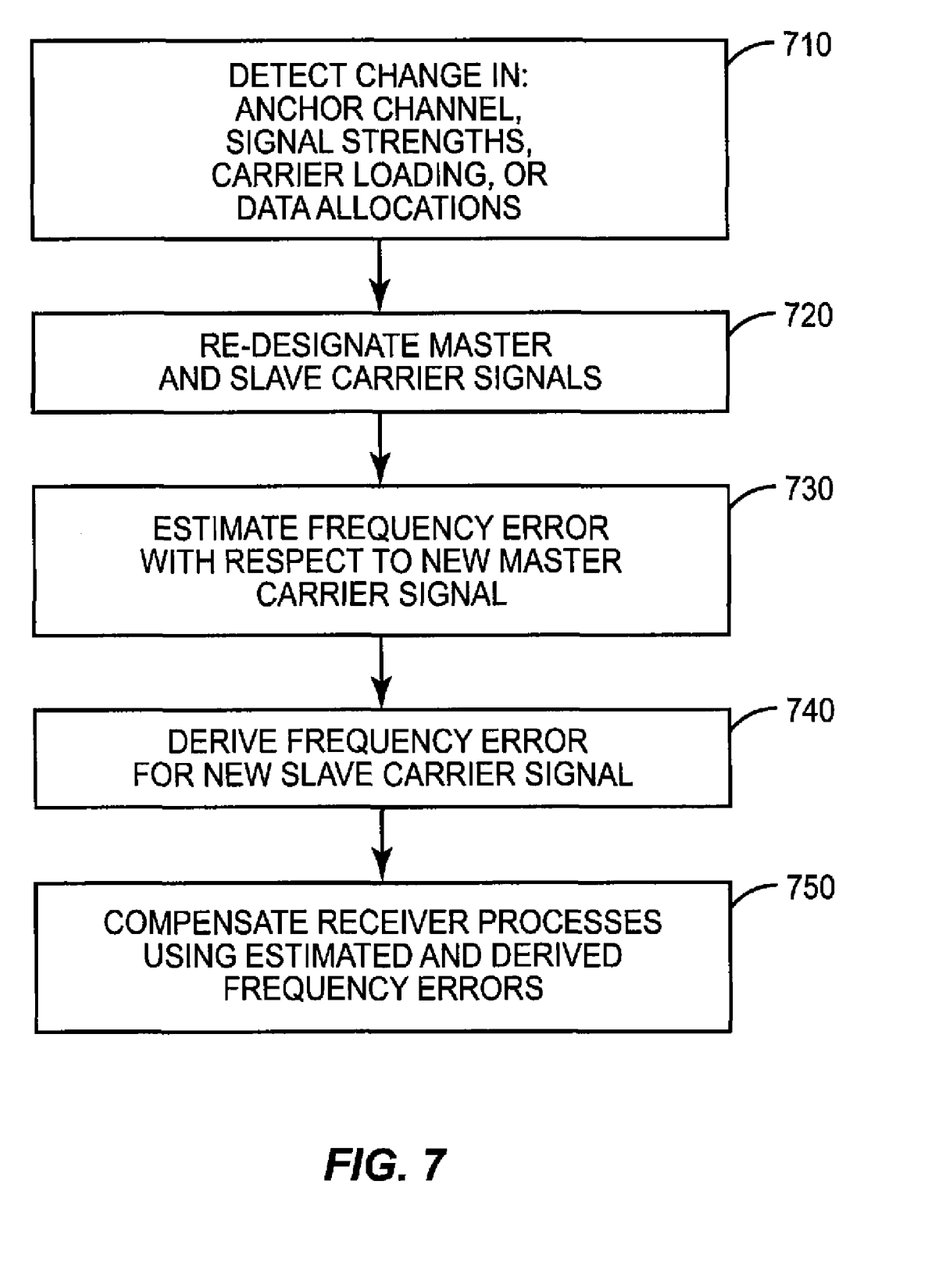
FIG. 7 is another logic flow diagram illustrating an exemplary method for re-designating master and slave carrier signals in response to one or more changes in the received carrier signals.

The estimation and derivation procedures discussed above may be periodically repeated, so that receiver frequency error and timing offsets are continuously tracked as needed for each of the carrier signals. In some cases, however, signal conditions or system configuration may change, in which case it may be desirable to re-designate master and slave carrier signals. FIG. 7 is a process flow diagram illustrating such a change, which might be triggered, as shown at block 710, by a detected change in one or more of the anchor channel (i.e., control information for the receiver is shifted from one carrier to another), signal strengths, carrier loading, or relative data allocations.

In response to this change, master carrier signals and slave carrier signals are re-designated, using the same or similar criteria as described before. At block 730, a receiver frequency error with respect to the new master carrier signal is estimated, and at block 740, a frequency error with respect to the new slave carrier signal is derived, based on the master carrier signal frequency error. At block 750, one or more receiver processes for the master and slave carrier signals are compensated using the estimated and derived frequency errors, respectively.

Those skilled in the art will appreciate that a frequency error or time offset that was previously derived for a slave carrier signal may be used to initialize the error estimation process of block 730 when the slave carrier signal is re-designated as a master carrier signal. Thus, for example, a slave carrier signal that only infrequently carries data targeted to a given mobile receiver may be rapidly acquired and tracked when data allocations shift to that signal.

Broadly speaking, the various methods of frequency error compensation described herein, and variations thereof, may be implemented using wireless receivers configured for processing various types of signals, including, but not limited to, communication signals formatted according to standards for Wideband Code-Division Multiple Access (W-CDMA), cdma2000, and Evolved-UMTS Terrestrial Radio Access (E-UTRA, the LTE air interface). Accordingly, compatible receivers according to embodiments of the present invention may employ G-RAKE processing, chip equalization, digital processing techniques (including FFT-based demodulation of an OFDMA signal), subtractive interference cancellation techniques, interference projection techniques, or the like.

Those skilled in the art will appreciate that several of the various circuits described herein, e.g., with respect to mobile receiver 220 may comprise hardware, software, or any combination thereof. In some embodiments, control processor 350 may comprise at least one special- or general-purpose microprocessor circuit (to include DSP-type processors), configured with appropriate software and/or firmware to carry out one or more of the methods and techniques described herein. In such embodiments, the above-described operative configuration of the one or more circuits of mobile receiver 220 may be obtained by, for example, provisioning a memory/storage device of the mobile receiver 220 with a computer program comprising program instructions corresponding to the one or more of the described processing flows or variants thereof. Of course, it will be appreciated that it may be advantageous to implement at least a portion of the signal processing using dedicated hardware-based processing elements.

Broadly, the teachings of the present disclosure thus include various techniques and corresponding apparatus for frequency error compensation with respect to multiple wireless communication signals transmitted via distinct radio carriers at distinct radio frequencies. Frequency errors estimated from one or more master carrier signals may be used to derive receiver frequency errors corresponding to one or more slave carrier signals, for use in compensating receiver processes for those slave carrier signals. With the variations of the methods and apparatus described herein in mind, those skilled in the art will appreciate that the present invention is not limited by the foregoing discussion, nor is it limited by the accompanying drawings. Indeed, the present invention is limited only by the following claims, and their legal equivalents.

What is claimed is:

1. In a wireless communication device, a method of frequency error compensation, comprising:
   receiving first and second wireless communication signals transmitted via first and second radio-frequency carriers at distinct first and second radio frequencies, respectively;
   designating one of the first and second wireless communication signals as a first master carrier signal and the other of the first and second wireless communication signals as a first slave carrier signal, responsive to one or both of the received first and second wireless communication signals;
   estimating a first receiver frequency error for the device with respect to the first master carrier signal;
   calculating a second receiver frequency error from the first receiver frequency error, for use in compensating one or more receiver processes performed on the first slave carrier signal.

2. The method of claim 1, wherein calculating the second receiver frequency error comprises scaling the first receiver frequency error with the ratio of the second and first radio frequencies.

3. The method of claim 1, further comprising:
   estimating a first timing offset using the master carrier signal;
   deriving a second timing offset from the first timing offset for use in adjusting a timing for one or more receiver processes performed on the slave carrier signal.

4. The method of claim 1, wherein at least one of the first and second wireless communication signals is formatted according to standards for one of:
   Wideband Code-Division Multiple Access (W-CDMA); and
   Evolved-UMTS Terrestrial Radio Access (E-UTRA).

5. The method of claim 1, wherein designating one of the first and second wireless communication signals as the first master carrier signal is based on at least one of:
   which of the first and second wireless communication signals carries control signaling for the wireless communication device;
   signal strengths for the first and second wireless communication signals; and
   carrier loading of the first and second radio-frequency carriers.

6. The method of claim 5, wherein designating one of the first and second wireless communication signals as the first master carrier signal is based at least on carrier loading of the first and second radio-frequency carriers, the method further comprising determining carrier loading information from signaling data in one or both of the first and second wireless communication signals.

7. The method of claim 1, further comprising:
   receiving a third wireless communication signal transmitted via a third radio-frequency carrier at a third radio frequency distinct from the first and second radio frequencies;
   designating the third wireless communication signal as a second master carrier signal; and
   estimating a third receiver frequency error using the second master carrier signal; wherein calculating the second receiver frequency error comprises calculating the second receiver frequency error from the first and third receiver frequency errors.

8. The method of claim 7, wherein calculating the second receiver frequency error comprises scaling the first receiver frequency error with the ratio of the second and first radio frequencies, scaling the third receiver frequency error with the ratio of the second and third radio frequencies, and calculating a weighted average of the scaled first and third receiver frequency errors.

9. The method of claim 8, wherein the averaging weights are determined based on at least one of:
   signal strengths for the first and second master carrier signals; and
   carrier loading of the first and second master carrier signals.

10. The method of claim 1, further comprising:
receiving a third wireless communication signal transmitted via a third radio-frequency carrier at a third radio frequency distinct from the first and second radio frequencies;
designating the third wireless communication signal as a second slave carrier signal; and
deriving a third receiver frequency error from the first receiver frequency error for use in compensating one or more receiver processes performed on the second slave carrier signal.

11. The method of claim 1, further comprising:
re-designating the first slave carrier signal as a new master carrier signal and re-designating the first master carrier signal as a new slave carrier signal;
estimating a third receiver frequency error using the new master carrier signal;
deriving a fourth receiver frequency error from the third receiver frequency error for use in compensating one or more receiver processes performed on the new slave carrier signal.

12. The method of claim 11, wherein the re-designating of the first slave carrier signal and first master carrier signal is responsive to detecting a change in at least one of:
which of the first and second wireless communication signals carries control signaling for the wireless communication device;
signal strengths for the first and second wireless communication signals;
carrier loading of the first and second radio-frequency carriers; and
data allocations for the wireless communication device on the first and second wireless communication signals.

13. A wireless communication device, comprising:
first and second receiver front-end circuits configured to receive first and second wireless communication signals transmitted via first and second radio-frequency carriers at distinct first and second radio frequencies, respectively;
a control processor configured to designate one of the first and second wireless communication signals as a first master carrier signal and the other of the first and second wireless communication signals as a first slave carrier signal; and
a frequency error estimation circuit configured to estimate a first receiver frequency error using the received first master carrier signal;
wherein the control processor is further configured to calculate a second receiver frequency error from the first receiver frequency error, for use in compensating one or more receiver processes performed on the first slave carrier signal.

14. The wireless communication device of claim 13, wherein the control processor is configured to calculate the second receiver frequency error by scaling the first receiver frequency error with the ratio of the second and first radio frequencies.

15. The wireless communication device of claim 13, further comprising a timing circuit configured to estimate a first timing offset using the master carrier signal, wherein the control processor is further configured to:
derive a second timing offset from the first timing offset for use in adjusting a timing for one or more receiver processes performed on the slave carrier signal.

16. The wireless communication device of claim 13, wherein at least one of the first and second wireless communication signals is formatted according to standards for one of:
Wideband Code-Division Multiple Access (W-CDMA); and
Evolved-UMTS Terrestrial Radio Access (E-UTRA).

17. The wireless communication device of claim 13, wherein the control processor is configured to designate one of the first and second wireless communication signals as the first master carrier signal based on at least one of:
which of the first and second wireless communication signals carries control signaling for the wireless communication device;
signal strengths for the first and second wireless communication signals; and
carrier loading of the first and second radio-frequency carriers.

18. The wireless communication device of claim 17, wherein the control processor is configured to designate one of the first and second wireless communication signals as the first master carrier signal based at least on carrier loading of the first and second radio-frequency carriers, further comprising determining carrier loading information from signaling data in one or both of the first and second wireless communication signals.

19. The wireless communication device of claim 13, further comprising a third receiver front-end circuit configured to receive a third wireless communication signal transmitted via a third radio-frequency carrier at a third radio frequency distinct from the first and second radio frequencies; wherein the control processor is further configured to:
designate the third wireless communication signal as a second master carrier signal; and
calculate the second receiver frequency error from the first receiver frequency error and a third receiver frequency error estimated from the second master carrier signal.

20. The wireless communication device of claim 19, wherein calculating the second receiver frequency error comprises scaling the first receiver frequency error with the ratio of the second and first radio frequencies, scaling the third receiver frequency error with the ratio of the second and third radio frequencies, and calculating a weighted average of the scaled first and third receiver frequency errors.

21. The wireless communication device of claim 20, wherein the control processor is further configured to determine the averaging weights based on at least one of:
signal strengths for the first and second master carrier signals; and
carrier loading of the first and second master carrier signals.

22. The wireless communication device of claim 13, further comprising a third receiver front-end circuit configured to receive a third wireless communication signal transmitted via a third radio-frequency carrier at a third radio frequency distinct from the first and second radio frequencies; wherein the control processor is further configured to:
designate the third wireless communication signal as a second slave carrier signal;
derive a third receiver frequency error from the first receiver frequency error for use in compensating one or more receiver processes performed on the second slave carrier signal.

23. The wireless communication device of claim 13, wherein the control processor is further configured to:
re-designate the first slave carrier signal as a new master carrier signal and re-designate the first master carrier signal as a new slave carrier signal;
derive a third receiver frequency error from a fourth receiver frequency error estimated using the new master carrier signal, for use in compensating one or more receiver processes performed on the new slave carrier signal.

24. The wireless communication device of claim 13, wherein the control processor is further configured to re-designate the first slave carrier signal and first master carrier signal responsive to a change detected in at least one of:

which of the first and second wireless communication signals carries control signaling for the wireless communication device;

signal strengths for the first and second wireless communication signals;

carrier loading of the first and second radio-frequency carriers; and data allocations for the wireless communication device on the first and second wireless communication signals.

* * * * *

UNITED STATES PATENT AND TRADEMARK OFFICE
CERTIFICATE OF CORRECTION

| | | |
|---|---|---|
| PATENT NO. | : 7,991,378 B2 | Page 1 of 1 |
| APPLICATION NO. | : 12/198366 | |
| DATED | : August 2, 2011 | |
| INVENTOR(S) | : Lindoff et al. | |

It is certified that error appears in the above-identified patent and that said Letters Patent is hereby corrected as shown below:

In Column 6, Line 16, delete "AID" and insert -- A/D --, therefor.

Signed and Sealed this
Twenty-seventh Day of December, 2011

David J. Kappos
*Director of the United States Patent and Trademark Office*